(12) United States Patent
Vaudez (10) Patent No.: US 9,966,156 B2
(45) Date of Patent: May 8, 2018

(54) PROCESS FOR MANUFACTURING A PELLET OF AT LEAST ONE METAL OXIDE

(71) Applicants: COMMISSARIAT A L'ENERGIE ATOMIQUE ET AUX ENERGIES ALTERNATIVES, Paris (FR); AREVA NC, Courbevoie (FR)

(72) Inventor: Stéphane Vaudez, Aix en Provence (FR)

(73) Assignees: Commissariat a l'Energie Atomique et aux Energies Alternatives, Paris (FR); Orano Cycle, Courbevoie (FR)

( * ) Notice: Subject to any disclaimer, the term of this patent is extended or adjusted under 35 U.S.C. 154(b) by 0 days. days.

(21) Appl. No.: 15/535,071

(22) PCT Filed: Dec. 17, 2015

(86) PCT No.: PCT/EP2015/080266
§ 371 (c)(1),
(2) Date: Jun. 12, 2017

(87) PCT Pub. No.: WO2016/097171
PCT Pub. Date: Jun. 23, 2016

(65) Prior Publication Data
US 2017/0345521 A1    Nov. 30, 2017

(30) Foreign Application Priority Data
Dec. 18, 2014   (FR) ...................................... 14 62740

(51) Int. Cl.
*G21C 21/02*    (2006.01)
*C01G 56/00*    (2006.01)
(Continued)

(52) U.S. Cl.
CPC .......... *G21C 21/02* (2013.01); *C01G 56/007* (2013.01); *G21C 3/04* (2013.01); *G21C 3/623* (2013.01);
(Continued)

(58) Field of Classification Search
None
See application file for complete search history.

(56) References Cited

U.S. PATENT DOCUMENTS 4,052,330 A    10/1977   Jensen et al.
4,247,495 A *  1/1981   Ennerst ................. G21C 3/623
                                                      252/643

(Continued)

FOREIGN PATENT DOCUMENTS

FR    2860639 A1    4/2005
FR    2998288 A1    5/2014

*Primary Examiner* — Joseph D Anthony
(74) *Attorney, Agent, or Firm* — Alston & Bird LLP

(57) ABSTRACT

The present invention relates to a process for sintering a compacted powder of at least one oxide of a metal selected from an actinide and a lanthanide, this process comprising the following successive steps, carried out in a furnace and under an atmosphere comprising an inert gas, dihydrogen and water:

(a) a temperature increase from an initial temperature $T_I$ up to a hold temperature $T_P$,
(b) maintaining the temperature at the hold temperature $T_P$, and
(c) a temperature decrease from the hold temperature $T_P$ down to a final temperature $T_F$, in which the $P(H_2)/P(H_2O)$ ratio is such that:
$500 < P(H_2)/P(H_2O) \leq 50\,000$, during step (a), from $T_I$ until a first intermediate temperature $T_{i1}$ between 1000° C. and $T_P$ is reached, and (Continued)

$P(H_2)/P(H_2O) \leq 500$, at least during step (c), from a second intermediate temperature $T_{i2}$ between $T_P$ and 1000° C., until $T_F$ is reached.

22 Claims, 4 Drawing Sheets

(51) Int. Cl.
  *G21C 3/62* (2006.01)
  *G21C 3/04* (2006.01)
(52) U.S. Cl.
  CPC ...... *C01P 2002/50* (2013.01); *C01P 2006/44* (2013.01); *G21C 2003/045* (2013.01)

(56) References Cited

U.S. PATENT DOCUMENTS

| | | | | |
|---|---|---|---|---|
| 4,430,276 | A | * | 2/1984 | Radford .................. G21C 3/623 252/640 |
| 4,885,147 | A | * | 12/1989 | Murakami ........... C01G 43/025 252/636 |
| 5,641,435 | A | | 6/1997 | Wadekamper |
| 6,733,699 | B1 | * | 5/2004 | Haas ...................... G21C 21/02 264/0.5 |
| 6,984,344 | B2 | * | 1/2006 | Gotta ..................... G21C 3/623 252/643 |
| 2005/0167861 | A1 | * | 8/2005 | Vandergheynst ...... G21C 3/623 264/0.5 |

* cited by examiner

PROCESS FOR MANUFACTURING A PELLET OF AT LEAST ONE METAL OXIDE

CROSS-REFERENCE TO RELATED APPLICATIONS

This application is a U.S. national phase under the provisions of 35 U.S.C. § 371 of International Patent Application No. PCT/EP15/80266 filed Dec. 17, 2015, which in turn claims priority of French Patent Application No. 1462740 filed Dec. 18, 2014. The disclosures of such international patent application and French priority patent application are hereby incorporated herein by reference in their respective entireties, for all purposes.

TECHNICAL FIELD

The invention relates to a process for manufacturing a pellet, in particular a pellet of at least one metal oxide, for example a pellet of a uranium and plutonium mixed oxide $(U,Pu)O_2$.

In particular, this manufacturing process implements a sintering process enabling a single metal oxide, or even a mixed oxide with at least two metals, to be prepared, from a compacted powder of the corresponding single metal oxides, this single or mixed metal oxide having an apparent specific gravity as well as a thermal stability of this apparent specific gravity that are improved, even in the hypothesis where the starting single oxide(s) comprise(s) traces of carbon species.

Such single or mixed metal oxides and pellets are of great interest for manufacturing fuel intended to many types of nuclear reactors, specially light water reactors or fast neutron reactors.

STATE OF PRIOR ART

Among metal oxides used in the field of nuclear industry, uranium oxides as well as some uranium-based mixed oxides, and in particular uranium and plutonium mixed oxides $(U,Pu)O_2$, are part of the most commonly used metal oxides for manufacturing nuclear fuels.

Indeed, plutonium most often mixed with uranium, is an energetic material which can be exploited in nuclear reactors, either in light water reactors (LWR), including pressurised water reactors (PWR) and boiling water reactors (BWR), or even in fast neutron reactors (FNR).

Mixed metal oxides used for manufacturing nuclear fuels, which are conventionally as compacted and sintered pellets, have to meet a number of requirements. Among these requirements, such nuclear fuel pellets must have an apparent specific gravity, which is not only high, but which is also stable, according to criteria set out hereinafter.

The final apparent specific gravity of the pellets depends not only on the properties of the powder of the metal oxide(s) from which the pellets are obtained, such as homogeneity or even the very low impurity content, or even the absence of impurities, but also on the parameters of the process for manufacturing these pellets and, in particular, the parameters of the sintering step.

Generally, current processes for manufacturing nuclear fuel pellets of a mixed oxide $(U,Pu)O_2$ (also called "MOX nuclear fuel" or even "MOX fuel") are based on a conventional so-called "powder metallurgy" process which schematically comprises the following steps of:

preparing powders of uranium oxide $UO_2$ and of plutonium oxide $PuO_2$, which comprises in particular synthesising, mixing and/or micronizing said powders, shaping the powders thus prepared in the form of pellets, and then densifying the powders thus shaped, in particular by a heat treatment such as sintering.

The shaping step is generally carried out by pressing and/or compacting consisting in applying a compaction pressure of 300 MPa to 500 MPa.

Conventionally, the step of densifying the previously shaped powders is carried out by sintering made by implementing, in a furnace, a thermal cycle comprising:

increasing the temperature, for example from room temperature to a hold temperature of 1 700° C., maintaining, for a duration of 4 h, at this hold temperature of 1 700° C., and then decreasing the temperature from this hold temperature of 1 700° C. to room temperature.

This thermal cycle just described is carried out under an atmosphere which is controlled at the inlet of the furnace and which comprises a mixture of argon, dihydrogen in a volume ratio $Ar/H_2$ of 95/5, and water.

The presence of water in the atmosphere enables the oxygen potential of the atmosphere to be controlled upon sintering and thus the stoichiometry required for the fuel to be set. This stoichiometry is defined by the O/M ratio corresponding to the ratio of the oxygen molar content, noted O, to the metal(s) molar content, noted M.

This O/M ratio is indeed variable as a function of the type of reactors in which the nuclear fuel pellets will be subsequently used.

Therefore, for use in FNR type reactors, the pellets of mixed oxide $(U,Pu)O_2$, which have a Pu atomic content between 15% and 30% of the total atomic content of U+Pu, must have an O/M ratio of at least 1.94 and, more generally, around 1.98.

To reach such O/M ratio values, the hydrogen argon atmosphere, in the volume ratio $Ar/H_2$ of 95/5, which prevails in the furnace during the thermal cycle applied for carrying out the densification step, has a water content:

between 10 ppm and 200 ppm for a Pu atomic content in the order of 15% of the total atomic content of U+Pu, and between 100 ppm and 500 ppm for a Pu atomic content in the order of 30% of the total atomic content of U+Pu.

For use in LWR type reactors, the pellets of mixed oxide $(U,Pu)O_2$, which have a Pu atomic content lower than or equal to 12% of the total atomic content of U+Pu, must have an O/M ratio of 2.00. Such a value is reached with a water amount, in this hydrogen argon atmosphere with 5% volume of dihydrogen applied in the furnace, higher than or equal to 1 000 ppm.

The conventional powder metallurgy process thus enables pellets of mixed oxides $(U,Pu)O_2$ to be obtained, from powders of uranium oxide $UO_2$ and of plutonium oxide $PuO_2$, possibly mixed with chamotte (which is a mixed oxide $(U,Pu)O_2$ from ground recycled rejects).

Among all the target criteria, the pellets of mixed oxides $(U,Pu)O_2$ have in particular to meet the following two criteria:

an apparent specific gravity higher than or equal to 94.5% of the theoretical specific gravity, which corresponds to a closed porosity of less than 6.5%, and the absence of dedensification of these pellets which results in a thermal stability of this apparent specific gravity, which should not decrease under the effect of a sustained sintering isotherm, conventionally carried out by applying a temperature of 1 700° C. for a period of 24 h.

If most of the sintered pellets of mixed oxides $(U,Pu)O_2$ manufactured by the powder metallurgy process make it possible to meet both criteria above, it is observed that some of them however do not achieve the specified apparent specific gravity and/or the thermal stability of this apparent specific gravity which is required.

It is the particular case of pellets of mixed oxides $(U,Pu)O_2$ manufactured according to this powder metallurgy process, from powders of uranium oxide $UO_2$ and of plutonium oxide $PuO_2$ comprising small amounts, even called "traces", of carbon species, in a mass content typically higher than or equal to 500 ppm carbon equivalent. The inventors have indeed noticed that such sintered pellets have a dedensification, under the effect of a sintering isotherm at 1 700° C. for 24 h, and do not meet consequently the second thermal stability criterion of the apparent specific gravity set out above. This dedensification phenomenon, observed when $UO_2$ and $PuO_2$ powders comprise traces of carbon species, results in a swelling of the pellets which become porous, which makes them inadequate to their use in a nuclear reactor.

These carbon species in a content detrimental to the apparent specific gravity and/or to the thermal stability of the apparent specific gravity of the sintered pellets of mixed oxides $(U,Pu)O_2$ can originate from the uranium oxide $UO_2$ powder and/or the plutonium oxide $PuO_2$ powder synthesis process(es) per se that is(are) implemented in the powder metallurgy process.

These $UO_2$ and $PuO_2$ powders are conventionally synthesised through the gas pathway or liquid pathway. The liquid pathway synthesis requires in particular the implementation of precipitation, filtration and then calcination steps. Yet, the calcination step greatly conditions the content as well as the nature of carbon species present in said $UO_2$ and $PuO_2$ powders resulting therefrom. This calcination step is conventionally made on a filtered precipitate, at a temperature lower than 1 000° C. and under an oxidising atmosphere to the carbon contained in the carbon species, in order to convert the precipitate into oxides, these oxides being subsequently treated by the abovementioned powder metallurgy process.

However, the temperature and atmosphere conditions of the calcination step, which are in favor of the decrease of the carbon species final content in the metal oxides, cannot always be met, for technological reasons (problem of resistance of some of the inner elements of furnaces, . . . ), for safety reasons (explosion risk) and/or for reasons related to the control of the nature of the products obtained (modification of the O/M ratio and/or even the crystal structure of the metal oxides, . . . ).

The carbon species pollution of powders of uranium oxide $UO_2$ and/or plutonium oxide $PuO_2$ can also be due to other sources, for example to the additives (binders, organic lubricants) implemented during the process of synthesising these powders $UO_2$ and $PuO_2$. It can also be the pollution generated by the operating conditions of this synthesis process (atmosphere, grinding container, transport container).

In an attempt to overcome the presence of these carbon species in the powders of uranium oxide $UO_2$ and/or plutonium oxide $PuO_2$, in particular when their carbon equivalent content is higher than or equal to 500 ppm, it has been suggested to make the step of densifying these powders $UO_2$ and $PuO_2$ (previously shaped) by a sintering operated in an atmosphere having more oxidising conditions for carbon, for example by adding water, so as to promote degradation and/or volatilisation of these carbon species and their by-products.

Yet, the implementation of a sintering under such more oxidising conditions does not turn out to be satisfactory either because an unexpected dedensification of the pellets is also observed.

More precisely, the porosity of the pellets manufactured by the conventional powder metallurgy process, wherein the sintering is operated under more oxidising conditions, reaches values than can range up to 10% volume (10% vol). Such a porosity, being essentially closed, cannot be reduced by the modification of some of the parameters of the densification step (sintering) such as the increase in the duration of the step of maintaining at the hold temperature of 1 700° C. or even the increase in this hold temperature.

The purpose of the present invention is thus to overcome the abovementioned drawbacks and to provide a process for sintering a compacted powder comprising $UO_2$ and $PuO_2$ making it possible to obtain a mixed oxide $(U,Pu)O_2$, in particular in the form of pellets, which meets both abovementioned criteria, that is:

an apparent specific gravity which is higher than or equal to 94.5% of the theoretical specific gravity, and a thermal stability of this apparent specific gravity under the effect of a sintering isotherm at 1 700° C. for 24 h, and, in particular, in the case where the compacted powder comprises carbon species in carbon equivalent contents which are higher than or equal to 500 ppm.

Another purpose of the present invention is to provide a sintering process which is not only limited to sintering a compacted powder comprising $UO_2$ and $PuO_2$ for obtaining the corresponding mixed oxide $(U,Pu)O_2$, but which can be transposed to sintering:

a compacted powder comprising at least two different metal oxides for obtaining the corresponding metal mixed oxide, each metal being selected from an actinide and a lanthanide, or even a compacted powder of a metal oxide, this metal being selected from an actinide and a lanthanide, the metal mixed oxide, or the single metal oxide, thus obtained having an apparent specific gravity as well as a thermal stability of this apparent specific gravity which are improved, even in the case where the compacted powder comprises traces of carbon species, in a mass content typically higher than or equal to 500 ppm carbon equivalent.

Another purpose of the invention is to provide a process for manufacturing a pellet, such as a nuclear fuel pellet, from a powder of at least one oxide of a metal selected from an actinide and a lanthanide, this powder comprising optionally traces of carbon species, this pellet having concomitantly an apparent specific gravity and a thermal stability of this apparent specific gravity which are improved as well as a microstructure characterised by a phase distribution homogeneity in the case of a pellet of metal mixed oxide, for example a distribution homogeneity of the phase U—Pu in the case of a mixed oxide $(U,Pu)O_2$.

DISCLOSURE OF THE INVENTION

The previously set out purposes as well as others are achieved, firstly, by a process for sintering a compacted powder of at least one oxide of a metal $M_1$ selected from an actinide and a lanthanide, this process comprising the following successive steps (a) to (c), carried out in a furnace and under an atmosphere comprising an inert gas, dihydrogen and water, of:
- (a) increasing the temperature from an initial temperature $T_I$ to a hold temperature $T_P$, $T_P$ being between 1 400° C. and 1 800° C.,
- (b) maintaining, for a duration between 1 h and 10 h, the temperature to the hold temperature $T_P$, and
- (c) decreasing the temperature from the hold temperature $T_P$ to a final temperature $T_F$.

According to the invention, the ratio of the partial pressure of dihydrogen, noted $P(H_2)$, to the partial pressure of water, noted $P(H_2O)$, in said atmosphere is such that:
- $500<P(H_2)/P(H_2O)\leq 50\,000$, during step (a), from $T_I$ until a first intermediate temperature $T_{i2}$ between 1 000° C. and $T_P$ is reached, and
- $P(H_2)/P(H_2O)\leq 500$, at least during step (c), from a second intermediate temperature between $T_P$ and 1 000° C., until $T_F$ is reached.

The sintering process according to the invention enables obtaining a metal oxide which has an apparent specific gravity higher than or equal to 94.5% of the theoretical specific gravity of the metal oxide which is considered, this apparent specific gravity being further thermally stable.

It is set out that by the phrase "at least one oxide of a metal $M_1$ selected from an actinide and a lanthanide", it is intended that the compacted powder can be made only by a single oxide of metal $M_1$, but also by two, or even more, oxides of metal $M_1$, this metal $M_1$ being then with two, or even more different oxidation degrees.

The implementation of the sintering process according to the invention makes it possible, for example, to obtain uranium dioxide $UO_2$, plutonium dioxide $PuO_2$ or even cerium dioxide, or cerine, $CeO_2$, these single metal oxides being characterised by an apparent specific gravity and a thermal stability of this apparent specific gravity which are significantly improved.

In a particularly advantageous alternative of the invention, the compacted powder further comprises at least one oxide of a metal $M_2$ selected from scandium Sc, yttrium Y, an actinide and a lanthanide, $M_2$ being different from $M_1$, whereby, at the end of step (c), a mixed oxide comprising $M_1$ and $M_2$ is obtained.

As previously mentioned for the metal $M_1$, by the phrase "at least one oxide of a metal $M_2$ selected from scandium, yttrium, an actinide and a lanthanide", it is intended that the compacted powder can comprise only one oxide of metal $M_2$ or, on the contrary, several oxides of metal $M_2$, this metal $M_2$ being with distinct oxidation degrees.

In such an alternative, the sintering process according to the invention makes it possible to obtain a mixed oxide of metals $M_1$ and $M_2$, from the oxide of metal $M_1$ and the oxide of metal $M_2$, such a mixed oxide having an apparent specific gravity higher than or equal to 94.5% of the theoretical specific gravity of the mixed oxide which is considered, this apparent specific gravity being further thermally stable, which results in the absence of swelling of said sintered mixed oxide as obtained at the end of the sintering process.

The implementation of the sintering process according to the invention makes it possible, for example, to obtain mixed oxides of uranium and plutonium $(U,Pu)O_2$ or even mixed oxides of cerium and yttrium, also called yttriated cerine, $(Ce,Y)O_2$, these metal mixed oxides being also characterised by an apparent specific gravity and by a thermal stability of this apparent specific gravity which are significantly improved.

This result is unexpectedly and surprisingly achieved by the implementation of two distinct phases:
- a first phase in which the $P(H_2)/P(H_2O)$ ratio is such that $500<P(H_2)/P(H_2O)\leq 50\,000$ and which corresponds to a sintering carried out under a so-called "hydrogenated" atmosphere under reducing conditions for the carbon contained in the carbon species. This first phase is carried out during step (a) of increasing the temperature and, more precisely, from the initial temperature, noted $T_I$, up to the first intermediate temperature, noted $T_{i1}$, of between 1 000° C. and the hold temperature, noted $T_P$; and
- a second phase wherein the $P(H_2)/P(H_2O)$ ratio is such that $P(H_2)/P(H_2O)\leq 500$ and which corresponds to a sintering carried out in less reducing conditions, or more oxidising that the previous ones, for the carbon contained in the carbon species. This second phase is carried out at least during step (c) of decreasing the temperature and, more precisely, from the second intermediate temperature, noted $T_{i2}$, of between $T_P$ and 1 000° C., up to reach the final temperature $T_F$.

These first and second thermal phases are thus distinguished from each other by distinct values of partial pressure ratio $P(H_2)/P(H_2O)$. These ratio values can be adjusted by introducing, into the furnace, adapted amounts of either water or dioxygen which then reacts with the dihydrogen to form water.

Both these distinct phases can be implemented, either during a same thermal cycle, or during two consecutive thermal cycles.

Figure 1A:
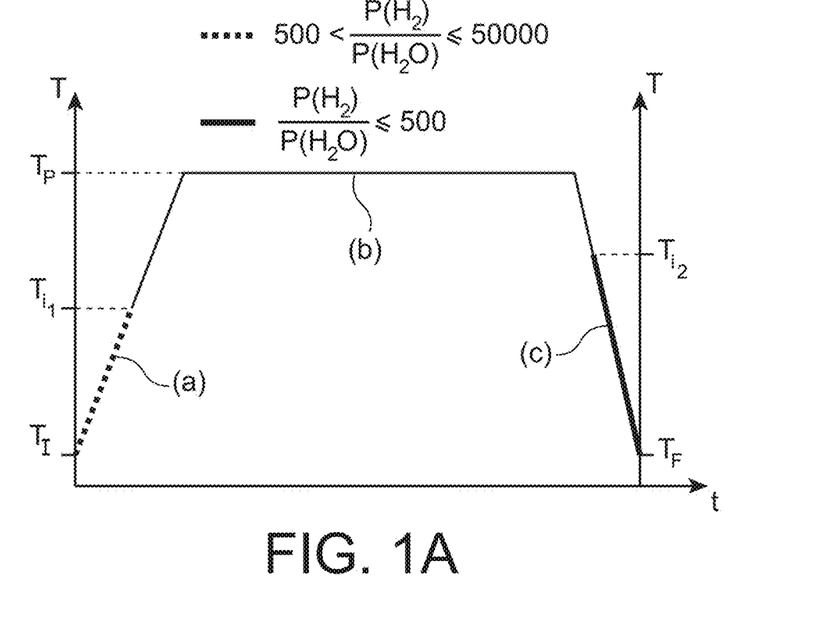
FIGS. 1A and 1B schematically illustrate the steps of the sintering process according to the invention implementing a single thermal cycle.
Figure 1B:
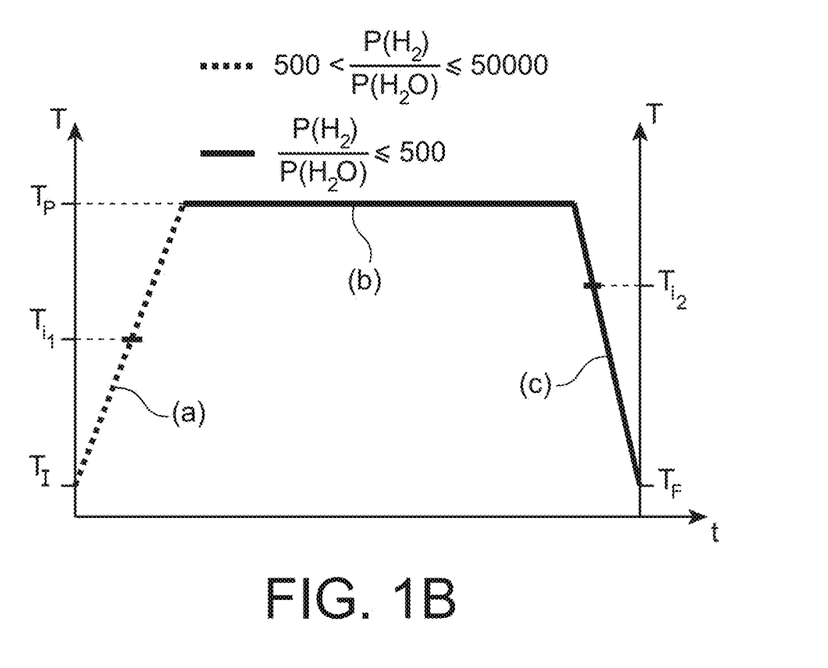

Appended FIGS. 1A and 1B illustrate two modes for implementing the first case wherein these two distinct phases are implemented during the same thermal cycle.

In reference to appended FIG. 1A, the thermal cycle, which comprises the first phase wherein $500<P(H_2)/P(H_2O)\leq 50\,000$ and the second phase wherein $P(H_2)/P(H_2O)\leq 500$, consists of step (a) of increasing the temperature from the initial temperature $T_I$ up to the hold temperature $T_P$, step (b) of maintaining the temperature at the hold temperature $T_P$, and step (c) of decreasing the temperature from the hold temperature $T_P$ to the final temperature $T_F$.

As seen in FIG. 1A, step (a) of increasing the temperature comprises a first intermediate temperature $T_{i1}$ of between the initial temperature $T_I$ and the hold temperature $T_P$, this first intermediate temperature $T_{i1}$ being between 1 000° C. and $T_P$.

Further, step (c) of decreasing the temperature comprises a second intermediate temperature $T_{i2}$ of between the hold temperature $T_P$ and the final temperature $T_F$, this second intermediate temperature $T_{i2}$ being between $T_P$ and 1 000° C.

In FIG. 1A, the first phase, wherein $500<P(H_2)/P(H_2O)\leq 50\,000$, is seen as a dashed line extending from $T_I$ to $T_{i1}$, whereas the second phase, wherein $P(H_2)/P(H_2O)\leq 500$, is seen as a thick line extending from $T_{i2}$ to $T_F$.

The sintering process according to the invention is thus characterised by the implementation of a part of the thermal cycle under a reducing atmosphere for the carbon and the starting metal oxide(s), which correspond to said at least one oxide of metal $M_1$ and, optionally, to said at least one oxide of metal $M_2$, with $500<P(H_2)/P(H_2O)\leq 50\,000$, such an approach being clearly contrary to the current practice of removing these carbon species by degradation and/or volatilisation. This first phase is carried out during step (a) of increasing the temperature, at least from $T_I$ to $T_{i1}$, or even from $T_I$ to $T_P$.

The thermal cycle of the sintering process according to the invention also comprises a part carried out in accordance with the current practice, that is under a less reducing (or more oxidising) atmosphere than the previous one, with an increased water content such that $P(H_2)/P(H_2O) \leq 500$. This second phase is carried out at least during step (c) of decreasing the temperature, at least from $T_{F2}$ to $T_F$, or even from $T_P$ to $T_F$.

The implementation of this second phase namely enables the O/M ratio of the, single or mixed, metal oxide to be set to the desired value, for example as a function of the FNR or LWR type of the reactor in which this metal oxide as obtained is intended to be used.

In particular, in order to increase the O/M ratio, this second phase of the thermal cycle wherein $P(H_2)/P(H_2O) \leq 500$ can advantageously be implemented not only during the entire duration of step (c) of decreasing the temperature, from the hold temperature $T_P$ and up to $T_F$, but also during all or part of step (b) of maintaining the temperature at the hold temperature $T_P$.

Appended FIG. 1B thus represents the case wherein the second phase of the thermal cycle is carried out during the entire duration of step (b) of maintaining the temperature at the hold temperature $T_P$, and step (c) of decreasing the temperature, from the hold temperature $T_P$ to the final temperature $T_F$.

In one alternative of the sintering process according to the invention, the first intermediate temperature $T_{i1}$ of step (a) of increasing the temperature is between 1 300° C. and $T_P$.

The first phase of the thermal cycle wherein the $P(H_2)/P(H_2O)$ ratio is such that $500<P(H_2)/P(H_2O) \leq 50\ 000$ can in particular be carried out during the entire duration of step (a) of increasing the temperature, from $T_I$ up to the hold temperature $T_P$, as illustrated in FIG. 1B.

In another alternative of the sintering process according to the invention, the second intermediate temperature $T_{i2}$ of step (c) of decreasing the temperature is between $T_P$ and 1 300° C.

In another alternative of the sintering process according to the invention, the second phase of the thermal cycle wherein the $P(H_2)/P(H_2O)$ ratio is such that $P(H_2)/P(H_2O) \leq 500$ can be implemented as soon as the first intermediate temperature $T_{i1}$ is reached and maintained until the final temperature $T_F$ is reached, it being reminded that this first intermediate temperature $T_{i1}$ is between 1 000° C. and the hold temperature $T_P$. In other words, in this alternative, and except for the case in which $T_{i1}=T_P$, the ratio $P(H_2)/P(H_2O) \leq 500$ is applied partly during step (a) of increasing the temperature, in the range of temperatures included between the first intermediate temperature $T_{i1}$ and the hold temperature $T_P$, as well as during step (b) of maintaining the temperature at the hold temperature $T_P$ and during step (c) of decreasing the temperature, from the hold temperature $T_P$ to the final temperature $T_F$.

The particular case wherein $T_{i1}=T_P$ is illustrated in FIG. 1B: the ratio $P(H_2)/P(H_2O) \leq 500$ is applied during step (b) of maintaining the temperature at the hold temperature $T_P$ and during step (c) of decreasing the temperature, from the hold temperature $T_P$ to the final temperature $T_F$.

The second phase of the sintering thermal cycle can thus immediately follow the first phase. However, it is quite possible to contemplate that step (a) of the sintering process according to the invention comprises an intermediate hold of maintaining the temperature at the first intermediate temperature $T_{i1}$, this intermediate hold separating the first and second phases of the thermal cycle.

Figure 2:
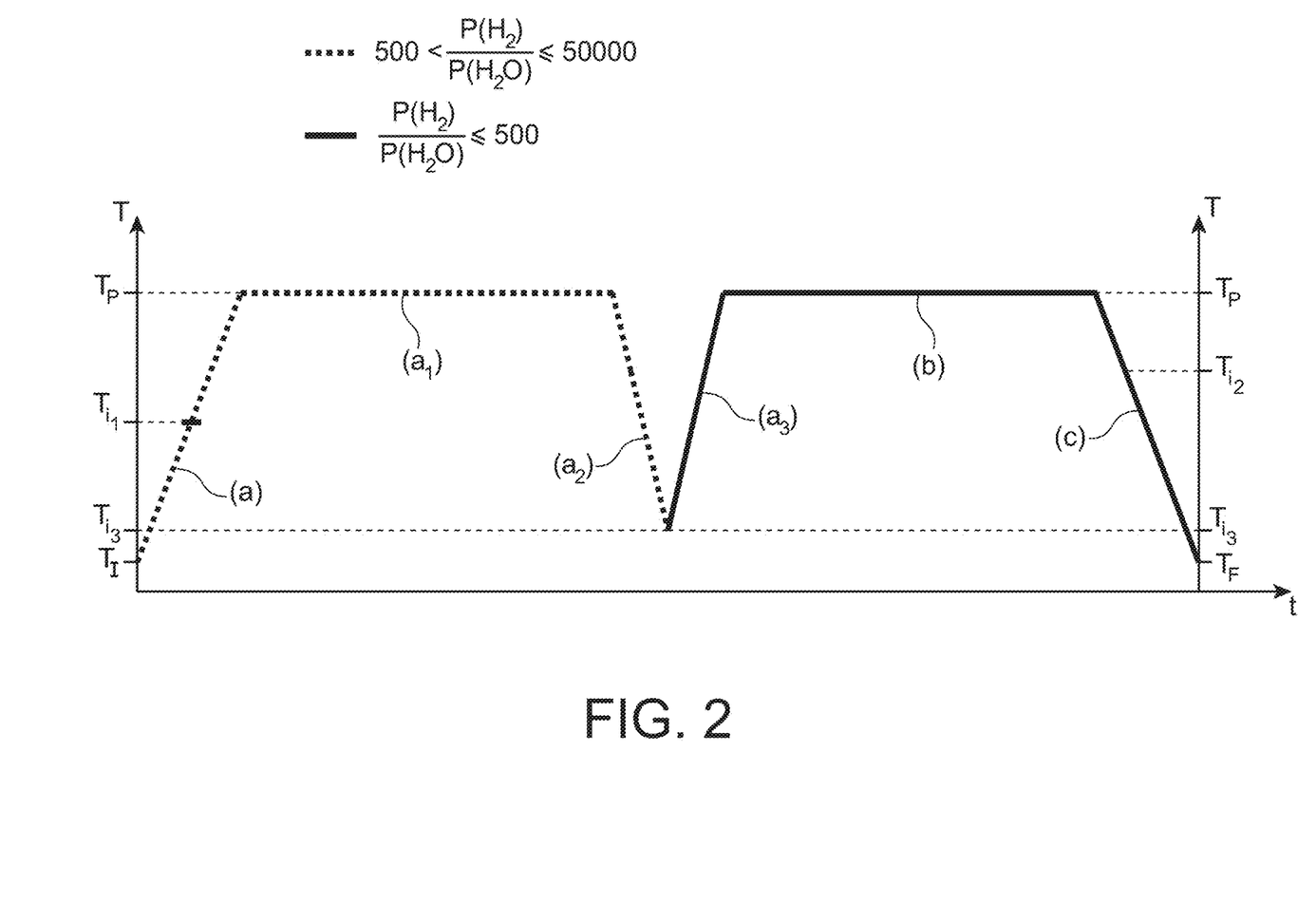
FIG. 2 schematically illustrates the steps of the sintering process according to the invention implementing two consecutive thermal cycles.

Appended FIG. 2 illustrates a mode of implementing the second case wherein both distinct phases are carried out during two consecutive thermal cycles.

As a result, when both distinct phases are implemented during two consecutive thermal cycles, the sintering process according to the invention further comprises, between steps (a) and (b), the following successive steps $(a_1)$ to $(a_3)$ of:

($a_1$) maintaining, for a duration between 1 h and 10 h, the temperature at the hold temperature $T_P$, ($a_2$) decreasing the temperature from the hold temperature $T_P$ to a third intermediate temperature, noted $T_{i3}$, ($a_3$) increasing the temperature from the third intermediate temperature $T_{i3}$ to the hold temperature $T_P$, and wherein the ratio $P(H_2)/P(H_2O)$ in said atmosphere is such that:

$500<P(H_2)/P(H_2O) \leq 50\ 000$, during steps (a), ($a_1$) and ($a_2$), and $P(H_2)/P(H_2O) \leq 500$, during steps ($a_3$), (b) and (c).

In reference to appended FIG. 2, the first phase wherein the $P(H_2)/P(H_2O)$ ratio is such that $500<P(H_2)/P(H_2O) \leq 50\ 000$ and which corresponds to a sintering carried out under a so-called "hydrogenated" atmosphere, is seen as a dashed line extending on the first thermal cycle made by step (a) of increasing the temperature from $T_I$ to $T_P$, step ($a_1$) of maintaining the temperature at $T_P$, and step ($a_2$) of decreasing the temperature from $T_P$ to $T_{i3}$.

The second phase in which the $P(H_2)/P(H_2O)$ ratio is such that $P(H_2)/P(H_2O) \leq 500$ and which corresponds to a sintering carried out under less reducing or more oxidising conditions than the previous ones, is seen as a thick line extending on the second thermal cycle made by step ($a_3$) of increasing the temperature from $T_{i3}$ to the hold temperature $T_P$, step (b) of maintaining the temperature at $T_P$, and step (c) of decreasing the temperature from $T_P$ to $T_F$.

In one advantageous alternative, the third intermediate temperature $T_{i3}$ is between 20° C. and 500° C.

The sintering process according to the invention carried out by means of two consecutive thermal cycles such as represented in FIG. 2 can be implemented either in a same sintering furnaces or, more advantageously, in two distinct sintering furnaces, each of the furnaces being then more particularly adapted to the operating conditions defined by the $P(H_2)/P(H_2O)$ ratio.

The particular alternatives of the sintering process that will be described hereinafter are applicable, regardless of whether there are one or two thermal cycles implemented.

In one alternative of the sintering process according to the invention, which in particular enables the O/M ratio to be increased, this process can further comprise, after step (c), an oxidation thermal treatment, for example a controlled oxidation treatment.

By way of example, such an oxidation thermal treatment can comprise the following successive steps of:

increasing the temperature from room temperature up to a hold temperature, this hold temperature being for example between 900° C. and 1 400° C., maintaining at this hold temperature, for example for a duration between 1 h and 10 h, and then decreasing the temperature from this hold temperature to the room temperature.

In another alternative of the sintering process according to the invention, the hold temperature $T_P$ is 1 700° C.

As previously, for step (a), it can be contemplated that step (c) of the sintering process according to the invention comprises an intermediate hold for maintaining the temperature at the second intermediate temperature $T_{i2}$, this intermediate hold being also able to separate the first and second phases of the thermal cycle.

In another alternative of the sintering process according to the invention, the initial temperature $T_I$ of step (a) and/or the final temperature $T_F$ of step (c) correspond(s) to the room temperature.

In another alternative of the sintering process according to the invention, increasing the temperature in step (a) and, optionally, in step ($a_3$), is carried out at a rate between 30° C./h and 400° C./h.

In another alternative of the sintering process according to the invention, decreasing the temperature in step (c) and, optionally, in step ($a_2$), is carried out at a rate between 100° CM and 900° C./h.

In another alternative of the sintering process according to the invention, the inert gas of the atmosphere prevailing in the sintering furnace is chosen from argon, helium and nitrogen. Advantageously, this inert gas is argon.

In another alternative of the sintering process according to the invention, the volume ratio of the inert gas to the dihydrogen is between 90/10 and 98/2.

More particularly advantageously, this inert gas/$H_2$ volume ratio is 95/5. Under such conditions of an inert gas/$H_2$ volume ratio of 95/5, water is present in the atmosphere prevailing in the furnace:
in an amount strictly lower than 100 ppm and, more precisely, between 1 ppm (value included) and 100 ppm (value not included) during the first phase of the thermal cycle of the sintering process according to the invention, wherein the $P(H_2)/P(H_2O)$ ratio is such that $500<P(H_2)/P(H_2O)\leq 50\ 000$, and
in an amount higher than or equal to 100 ppm during the second phase of the thermal cycle of the sintering process according to the invention, wherein the $P(H_2)/P(H_2O)$ ratio is such that $P(H_2)/P(H_2O)\leq 500$.

In another advantageous alternative of the sintering process according to the invention, when $M_1$, or $M_2$, is an actinide, the actinide is selected from uranium U, plutonium Pu, thorium Th and americium Am, advantageously from U, Pu and Th and, preferentially, from U and Pu.

In another alternative of the sintering process according to the invention, when $M_1$, or $M_2$, is a lanthanide, the lanthanide is cerium Ce.

The invention secondly relates to a process for manufacturing a pellet of at least one oxide of a metal $M_1$ chosen from an actinide and a lanthanide and, in particular, to a process for manufacturing a nuclear fuel pellet.

According to the invention, this manufacturing process comprises the following successive steps of:
preparing a powder of said at least one oxide of metal $M_1$,
compacting the prepared powder in the form of a pellet, and
heat treating the powder pellet compacted by the sintering process as defined above, the advantageous characteristics of this sintering process being possibly taken alone or in combination.

In other words, this process for manufacturing a pellet of at least one oxide of a metal $M_1$ chosen from an actinide and a lanthanide comprises the following successive steps of:
(1) preparing a powder of said at least one oxide of metal $M_1$,
(2) compacting the prepared powder in the form of a pellet,
(3) introducing the compacted powder pellet into a furnace and under an atmosphere comprising an inert gas, dihydrogen and water,
(4) increasing the temperature from an initial temperature $T_I$ up to a hold temperature $T_P$, $T_P$ being between 1 400° C. and 1 800° C.,
(5) maintaining the temperature, for a duration between 1 h and 10 h, to the hold temperature $T_P$, and
(6) decreasing the temperature from the hold temperature $T_P$ up to the final temperature $T_F$,
the $P(H_2)/P(H_2O)$ ratio in said atmosphere being such that:
$500<P(H_2)/P(H_2O)\leq 50\ 000$, during step (4), from $T_I$ until a first intermediate temperature $T_{i1}$ between 1 000° C. and $T_P$ is reached, and
$P(H_2)/P(H_2O)\leq 500$, at least during step (6), from a second intermediate temperature $T_{i2}$ between $T_P$ and 1 000° C., until $T_F$ is reached.

The manufacturing process according to the invention thus enables obtaining a pellet of a metal oxide having an apparent specific gravity higher than or equal to 94.5% of the theoretical specific gravity of the oxide which is considered, this apparent specific gravity being further thermally stable, causing no swelling of the sintered pellet, as obtained after step (6) of heat treatment.

Step (1) of preparing the powder of said at least one oxide of metal $M_1$ can in particular comprise at least one of the following steps selected from synthesising this oxide of metal $M_1$, grinding this oxide of metal $M_1$ as a powder, micronizing this powder of oxide of metal $M_1$, mixing this powder of oxide of metal $M_1$ with additives.

In particular, in the case where the compacted powder further comprises at least one oxide of a metal $M_2$ selected from an actinide and a lanthanide, $M_2$ being different from $M_1$, step (1) of preparing the powder can also comprise at least one of the above-described steps, read relative to $M_2$, (synthesising the oxide of metal $M_2$, grinding thereof, micronising thereof and mixing thereof with additives) and further, the step of making the mixture of the powder of oxide of metal $M_1$ with the powder of oxide of metal $M_2$.

The invention thirdly relates to the use of the pellet of at least one oxide of a metal $M_1$ manufactured by implementing the manufacturing process as defined above, the advantageous characteristics of this manufacturing process being possibly taken alone or in combination.

According to the invention, this pellet of at least one oxide of a metal $M_1$ can be used in the nuclear field.

In one advantageous version of the invention, this pellet of at least one oxide of a metal $M_1$ can be used as a nuclear fuel in a fast neutron reactor or in a light water reactor, such as a pressurised water reactor or a boiling water reactor.

Further characteristics and advantages of the invention will better appear upon reading the complementary description that follows and which relates to two examples for manufacturing uranium and plutonium mixed oxides according to the invention, the one having a Pu atomic content in the order of 10% (example 1), and the other having a Pu atomic content in the order of 30% (example 2), these Pu atomic contents being given with respect to the total Pu and U atomic content.

This complementary description, which refers in particular to FIGS. 3A, 3B, 4A and 4B as appended, is given by way of illustration for the object of the invention and should in no way be construed as limiting this object.

BRIEF DESCRIPTION OF THE DRAWINGS

FIGS. 1A, 1B and 2 each have been commented in the previous chapter.

DETAILED DISCLOSURE OF PARTICULAR EMBODIMENTS

Example 1

Manufacturing Pellets of Uranium and Plutonium Mixed Oxide Having the Formula $(U_{0.9023},Pu_{0.0977})O_2$
Preparing Pellets of Compacted Powders The present example 1 is carried out from a mixture of a powder of uranium oxide $UO_2$ and a powder of plutonium oxide $PuO_2$. This mixture has a Pu atomic content of 44% with respect to the total Pu and U atomic content as well as a carbon content of 1 850 ppm+/−100 ppm.

To this mixture, chamotte (that is a powder of uranium and plutonium mixed oxide $(U,Pu)O_2$ from recycled manufacturing rejects) is added for forming a primary mixture. This chamotte is introduced in a quantity enabling the Pu atomic content to be decreased from 44% to 28% with respect to the total Pu and U atomic content in this primary mixture.

This primary mixture is then ground and then sieved so as to obtain a so-called "master-batch".

Then, this master-batch is Pu-diluted by adding a powder of uranium oxide $UO_2$, to obtain a final mixture of powders in which the U/Pu atomic ratio is 90.23/9.77. This final mixture is then compacted into pellets having the form of cylindrical tablets.

Three distinct sintering processes, noted $F_{1.1}$, $F_{1.2}$ and $F_{1.3}$, have been conducted on these pellets to obtain sintered pellets of uranium and plutonium mixed oxide having the formula $(U_{0.9023},Pu_{0.0977})O_2$.
Sintering Process $F_{1.1}$ (Reference)

A first series of pellets is placed in a sintering furnace in which they are subjected to the following thermal cycle of:
- ($a_{1.1}$) increasing the temperature, at a rate of 120° C./h, from room temperature to a hold temperature of 1 700° C.,
- ($b_{1.1}$) maintaining, for 4 h, at this hold temperature of 1 700° C., and then
- ($c_{1.1}$) decreasing the temperature, at a rate of 300° C./h, from the hold temperature of 1 700° C. to the room temperature of 20° C.

The three steps ($a_{1.1}$), ($b_{1.1}$) and ($c_{1.1}$) of the thermal cycle detailed above have been conducted in an atmosphere comprising argon, dihydrogen in a $Ar/H_2$ volume ratio of 95/5, and water in a ratio $P(H_2)/P(H_2O)=42$. This ratio of 42 corresponds to an amount of 1 200 ppm of water in the atmosphere prevailing in the furnace.
Sintering Process $F_{1.2}$ (According to the Invention)

A second series of pellets is placed in a sintering furnace in which they are subjected to the following thermal cycle of:
- ($a_{1.2}$) increasing the temperature, at a rate of 120° C./h, from room temperature to a first intermediate temperature of 1 500° C.,
- ($a'_{1.2}$) increasing the temperature, at a rate of 120° C./h, of this first intermediate temperature of 1 500° C. to a hold temperature of 1 700° C.,
- ($b_{1.2}$) maintaining, for 4 h, at this hold temperature of 1 700° C., and then
- ($c_{1.2}$) decreasing the temperature, at a rate of 300° C./h, from the hold temperature of 1 700° C. to the room temperature of 20° C.

The four steps ($a_{1.2}$), ($a'_{1.2}$), ($b_{1.2}$) and ($c_{1.2}$) of the thermal cycle detailed above have been conducted in an atmosphere comprising argon, dihydrogen in an $Ar/H_2$ volume ratio of 95/5, and water:
- in a $P(H_2)/P(H_2O)$ ratio between 1 000 and 5 000, that is an amount of water between 50 ppm and 10 ppm in the atmosphere, during step ($a_{1.2}$), and then
- in a ratio $P(H_2)/P(H_2O)=42$, that is 1 200 ppm of water in the atmosphere, during steps ($a'_{1.2}$), ($b_{1.2}$) and ($c_{1.2}$).

The amount of water implemented in the atmosphere during step ($a_{1.2}$) is given by a range, in view of the low amounts involved,
Sintering Process $F_{1.3}$ (According to the Invention)

A third series of pellets is placed in a sintering furnace in which they are subjected to the following thermal cycle:
- ($a_{1.3}$) increasing the temperature, at a rate of 120° C./h, from room temperature to a hold temperature of 1 700° C.,
- ($b_{1.3}$) maintaining, for 4 h, at this hold temperature of 1 700° C., and then
- ($c_{1.3}$) decreasing the temperature, at a rate of 300° C./h, from the hold temperature of 1 700° C. to the room temperature of 20° C.

The three steps ($a_{1.3}$) to ($c_{1.3}$) of the thermal cycle detailed above have been conducted in an atmosphere comprising argon, dihydrogen in an $Ar/H_2$ volume ratio of 95/5, and water:
- in a $P(H_2)/P(H_2O)$ ratio between 1 000 and 5 000, that is an amount of water between 50 ppm and 10 ppm in the atmosphere, during step ($a_{1.3}$), and then
- in a ratio $P(H_2)/P(H_2O)=42$, that is 1 200 ppm of water in the atmosphere, during steps ($b_{1.3}$) and ($c_{1.3}$).

Characterisation of the Pellets of Mixed Oxide of the Formula $(U_{0.9023},Pu_{0.0977})O_2$ The three series of pellets of mixed oxide $(U_{0.9023},Pu_{0.0977})O_2$ obtained, after the implementation of the sintering processes $F_{1.1}$, $F_{1.2}$ and $F_{1.3}$ are all flawless.

These three series of sintered pellets have been characterised, according to the protocols described hereinafter, to determine their respective O/M ratio and apparent specific gravity values (the open porosity and closed porosity values are also deduced therefrom), their microstructure as well as their thermal stability.
Characterisation Protocols The O/M ratio is determined by thermogravimetry, under water saturated dihydrogen and at a temperature in the order of 950° C. The value obtained has a very low uncertainty, typically lower than 0.003.

The apparent specific gravity, noted Dh and expressed as a % of the theoretical specific gravity, is measured by hydrostatic weighing, in bromobenzene, by means of a hydrostatic specific gravity device, by applying the Archimedes' principle.

The open porosity, noted Po, as well as the closed porosity, noted Pf, are deduced from the value of the apparent specific gravity Dh by the formulae below:

$$Po = \frac{Dh - Dg}{Dth} \times 100$$

$$Pf = \frac{Dth - Dh}{Dth} \times 100$$

Dth and Dg respectively corresponding to the theoretical specific gravity and the geometrical specific gravity.

The microstructure is analysed by observing, with an optical microscope, sintered pellets in longitudinal cross-section and radial cross-section views. The presence of $UO_2$ and $UPuO_2$ islands is revealed by $UO_2$ chemical attack. A prior calibration carried out with COFRAC N° 74541B, or 74541A, certified object micrometer, indicates that the uncertainty on the dimensional measurements is typically lower than 10% on a relative basis.

To determine the thermal stability of the apparent specific gravity of the three series of sintered pellets, a thermal treatment of these pellets is operated by placing them into a furnace for 24 h at 1 700° C. under an atmosphere formed by an argon and dihydrogen mixture (in an $Ar/H_2$ volume ratio of 95/5). At the outlet of the furnace, and at the end of these 24 h, the apparent specific gravity of said pellets is measured by hydrostatic weighing. The sintered pellets are considered as "satisfactory", that is they have an apparent specific gravity which is thermally stable, when the variation in the apparent specific gravity is between 0 and 1.9% after this thermal treatment of 24 h at 1 700° C.

The carbon content is determined using a Sylab brand analyser (model CSBOX-HF) by the IR spectrophotometry method, after melting the sintered pellets.

Characterisation of the Sintered Pellets

The pellets resulting from the sintering processes $F_{1.1}$, $F_{1.2}$ and $F_{1.3}$ all have an O/M ratio equal to 2.00, in accordance with the oxygen potential set by the ratio $P(H_2)/P(H_2O)=42$ during steps $(b_{1.1})$, $(b_{1.2})$ and $(b_{1.3})$ of maintaining the temperature at 1 700° C. and steps $(c_{1.1})$, $(c_{1.2})$ and $(c_{1.3})$ of decreasing the temperature from 1 700° C. to the room temperature of 20° C.

Other characterisation data of these pellets from the sintering processes $F_{1.1}$, $F_{1.2}$ and $F_{1.3}$ (determined according to the protocols described above) are gathered in Table 1 hereinafter.

TABLE 1

Figure 3A:
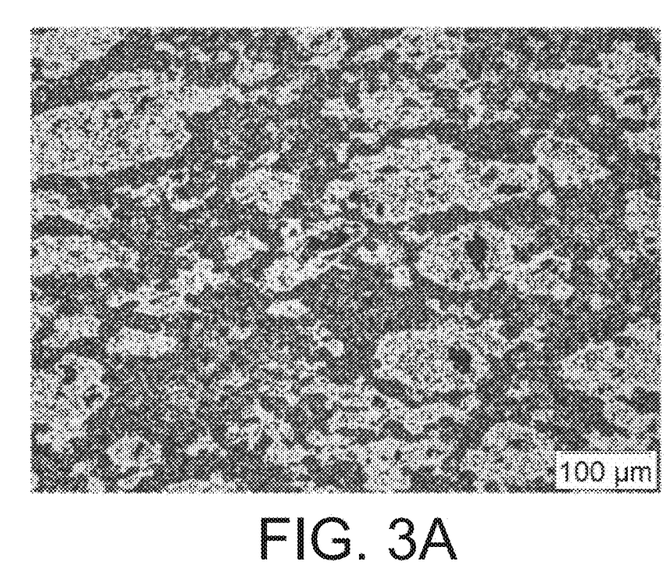
FIGS. 3A and 3B correspond to photographs taken with an optical microscope and showing the microstructure of pellets from the sintering processes $F_{1.1}$ (FIG. 3A) and $F_{1.3}$ (FIG. 3B) after attacking $UO_2$.
Figure 3B:
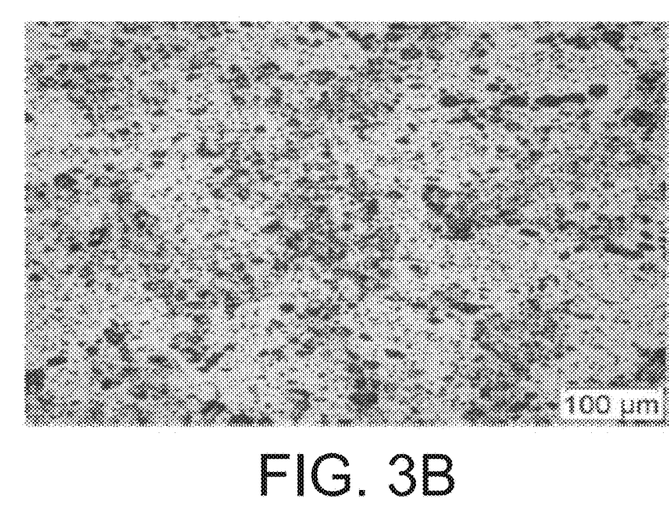

| Sintering | $F_{1.1}$ | $F_{1.2}$ | $F_{1.3}$ |
| --- | --- | --- | --- |
| Apparent specific gravity (% Dth) | 93.5 | 96.6 | 97.1 |
| Pf (%) | 6.1 | 3.1 | 1.8 |
| Po (%) | <1 | <1 | <1 |
| Thermal stability of the apparent specific gravity | non satisfactory | satisfactory | satisfactory |
| FIG. | 3A | | 3B |

As appears from Table 1, when switching from sintering $F_{1.1}$ to sintering $F_{1.3}$, the apparent specific gravity of the sintered pellets increases whereas their respective closed porosity decreases.

More precisely, the porosity of the pellets from the reference sintering $F_{1.1}$ is mostly closed (6.1%) and is found in master-batch aggregates. As can be seen in FIG. 3A, these master-batch aggregates have dimensions between 50 μm and 100 μm. On the other hand, pellets from sintering $F_{1.1}$ do not meet the criterion of thermal stability of the apparent specific gravity, in that the variation in the apparent specific gravity is established at −1%, meaning that the pellets have been dedensified and have consequently swollen after the heat treatment of 24 h at 1 700° C.

Pellets from sintering $F_{1.3}$ according to the invention have the strongest apparent specific gravity value (97.1% Dth). Further, FIG. 3B clearly highlights a better plutonium distribution homogeneity within the microstructure of these sintered pellets, which results in a higher volume ratio of the plutoniferous phase to the uraniferous phase. Further, if FIGS. 3A and 3B are compared, it is observed that the master-batch aggregates present in the pellets from sintering $F_{1.3}$ include less porosities than master-batch aggregates present in the pellets from sintering $F_{1.1}$.

Example 2

Manufacturing Pellets of Uranium and Plutonium Mixed Oxide Having the Formula $(U_{0.7},Pu_{0.3})O_2$ Preparing Pellets of Compacted Powders The present example 2 is made from a mixture of a powder of uranium oxide $UO_2$ and a powder of plutonium oxide $PuO_2$. This mixture has a Pu atomic content of 30% with respect to the total Pu and U atomic content as well as a carbon content of 3 500 ppm+/−100 ppm.

This mixture is compacted into pellets having the form of cylindrical tablets.

Three distinct sintering processes, noted $F_{2.1}$, $F_{2.2}$ and $F_{2.3}$, have been conducted, made from these pellets to obtain sintered pellets of uranium and plutonium mixed oxide having the formula $(U_{0.7},Pu_{0.3})O_2$.

Sintering Process $F_2$ (Reference)

A first series of pellets is placed into a sintering furnace in which they are subjected to the following thermal cycle of:

($a_{2.1}$) increasing the temperature, at a rate of 50° C./h, from room temperature to a hold temperature of 1 700° C., ($b_{2.1}$) maintaining, for 4 h, at this hold temperature of 1 700° C., and then ($c_{2.1}$) decreasing the temperature, at a rate of 300° C./h, from the hold temperature of 1 700° C. to the room temperature of 20° C.

The three steps ($a_{2.1}$), ($b_{2.1}$) and ($c_{2.1}$) of the thermal cycle detailed above have been conducted in an atmosphere comprising argon, dihydrogen in an $Ar/H_2$ volume ratio of 95/5, and water in a ratio $P(H_2)/P(H_2O)\leq500$. This ratio corresponds to an amount higher than or equal to 100 ppm of water in the atmosphere prevailing in the furnace during all the time of the thermal cycle.

Sintering Process $F_{2.2}$ (According to the Invention)

A second series of pellets is placed into a sintering furnace in which they are subjected to the following thermal cycle:

($a_{2.2}$) increasing the temperature, at a rate of 50° C./h, from room temperature to a hold temperature of 1 700° C., ($b_{2.2}$) maintaining, for 4 h, at this hold temperature of 1 700° C., and then ($c_{2.2}$) decreasing the temperature, at a rate of 300° C./h, from the hold temperature of 1 700° C. to the room temperature of 20° C.

The three steps ($a_{2.1}$), ($b_{2.2}$) and ($c_{2.2}$) of the thermal cycle detailed above have been conducted in an atmosphere comprising argon, dihydrogen in an $Ar/H_2$ volume ratio of 95/5, and water:

in a $P(H_2)/P(H_2O)$ ratio between 1 000 and 10 000, that is an amount of water between 50 ppm and 5 ppm in the atmosphere, during step ($a_{2.2}$), and then in a ratio $P(H_2)/P(H_2O) \leq 500$, which corresponds to an amount of water of 150 ppm, during steps ($b_{2.2}$) and ($c_{2.2}$).

Under the aforementioned conditions, sintered pellets characterised by an O/M ratio of about 1.94 have been obtained.

A first part, or batch 1, of the pellets thus resulting from sintering $F_{2.2}$ is set aside to be characterised. The second part, or batch 2, of the pellets thus resulting from sintering $F_{2.2}$ will be subjected to a further step of controlled oxidation.

Sintering Process $F_{2.3}$ (According to the Invention)

The third series of pellets consists of the batch 2 of sintered pellets from sintering $F_{2.2}$ above.

These sintered pellets of batch 2 are replaced in the sintering furnace in which they are subjected to a controlled oxidation heat treatment which comprises the following successive steps, made after step ($c_{2.2}$) above, of:
- ($d_{2.3}$) increasing the temperature, at a rate of 50° C./h, from room temperature to a hold temperature of 950° C.,
- ($e_{2.3}$) maintaining at this hold temperature of 950° C. for 4 h, and then
- ($f_{2.3}$) decreasing the temperature, at a rate of 300° C./h, from the hold temperature of 950° C. to the room temperature of 20° C.

Under the aforementioned conditions, sintered pellets characterised by an O/M ratio of about 1.97 are obtained.

Characterisation of Pellets of Mixed Oxide of the Formula $(U_{0.7},Pu_{0.3})O_2$ Characterisation data of pellets from sintering processes $F_{2.1}$, $F_{2.2}$ and $F_{2.3}$ (determined according to the protocols described above) are gathered in Table 2 hereinafter.

TABLE 2

Figure 4A:
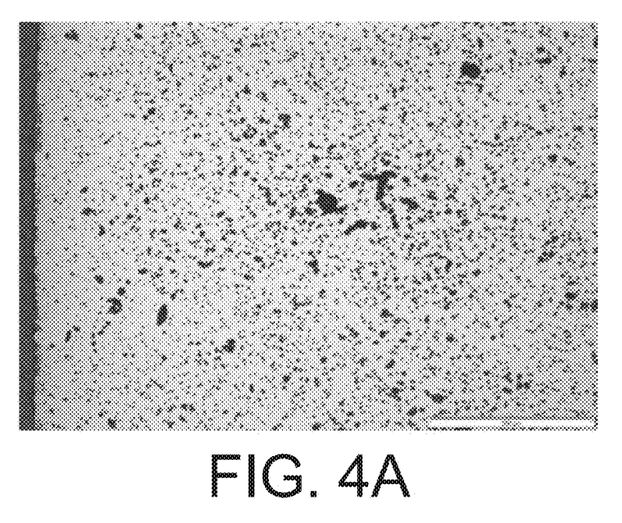
FIGS. 4A and 4B correspond to photographs taken with an optical microscope and showing the microstructure of pellets from the sintering processes $F_2$ (FIG. 4A) and $F_{2.2}$ (FIG. 4B) after attacking $UO_2$.
Figure 4B:
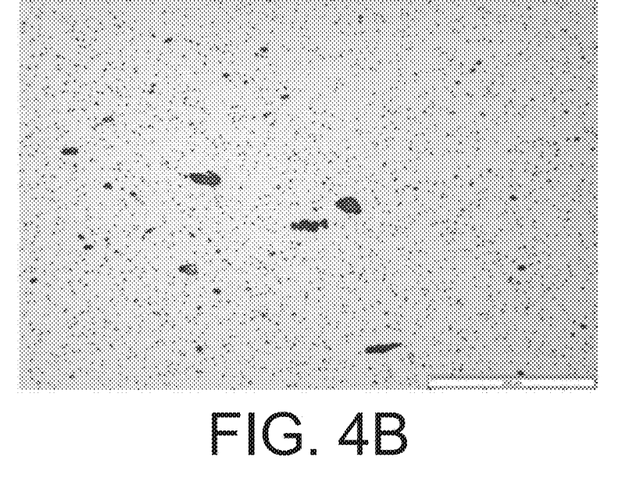

| Sintering | $F_{2.1}$ | $F_{2.2}$ | $F_{2.3}$ |
| --- | --- | --- | --- |
| Apparent specific gravity (% Dth) | 90.0 | 97.9 | 97.9 |
| Pf (%) | >9 | 1.7 | 1.7 |
| Po (%) | <1 | <1 | <1 |
| O/M ratio | not measured | 1.94 | 1.97 |
| C content (ppm) | 100 | 200 | 200 |
| Thermal stability of the apparent specific gravity | non satisfactory | satisfactory | satisfactory |
| FIG. | 4A | | 4B |

As previously, Table 2 shows that, when switching from sintering $F_{2.1}$ to sintering $F_{2.3}$, the apparent specific gravity of the sintered pellets increases whereas their respective closed porosity decreases.

The porosity of pellets from sintering $F_{201}$ (reference) is mostly a closed porosity (9%). As can be seen in FIG. 4A, the microstructure of pellets from this sintering $F_{2.1}$ have a few macropores having a diameter of several hundreds of μm as well as a very significant microporosity. On the other hand, pellets from sintering $F_{2.1}$ do not meet the criterion of thermal stability of the apparent specific gravity, because of a too high closed porosity of these sintered pellets.

Pellets from sintering $F_{2.2}$ in accordance with the invention have an apparent specific gravity of 97.9% Dth and meet the criterion of thermal stability of the apparent specific gravity. Their O/M ratio is 1.94. It is to be noted that in the absence of an intentional humidification introduced from step ($b_{2.2}$), an O/M ratio in the order of 1.92 would have be obtained. In reference to FIG. 4B, it is observed that pellets from sintering $F_{2.2}$ have a microstructure characterised by an improved homogeneity, a decreased porosity and, hence, an apparent specific gravity increased with respect to the microstructure of pellets from sintering $F_{2.1}$.

Pellets from sintering $F_{2.3}$, which correspond to pellets from sintering $F_{2.2}$ and then subjected to a further heat treatment step, under an atmosphere comprising water in an amount similar to that implemented in steps ($b_{2.2}$) and ($c_{2.2}$), are characterised by an O/M ratio higher than that of pellets from sintering $F_{2.2}$. It is set out that, to obtain such an increase from 1.94 to 1.97 of the O/M ratio, it would also have been contemplatable to increase the amount of water in the argon and dihydrogen atmosphere (Ar/5% $H_2$) during steps ($b_{2.2}$) and/or ($c_{2.2}$) of the sintering process $F_{2.2}$, in particular by passing it from 100 ppm to 300 ppm of water.

The invention claimed is:

1. A process for sintering a compacted powder of at least one oxide of a metal $M_1$ selected from an actinide and a lanthanide, this process comprising the following successive steps (a) to (c), carried out in a furnace and under an atmosphere comprising an inert gas, dihydrogen and water, of:
   (a) increasing the temperature from an initial temperature $T_I$ to a hold temperature $T_P$, $T_P$ being between 1 400° C. and 1 800° C.,
   (b) maintaining the temperature at the hold temperature $T_P$ for a duration between 1 h and 10 h, and
   (c) decreasing the temperature from the hold temperature $T_P$ to a final temperature $T_F$,
   wherein the ratio of the partial pressures $P(H_2)/P(H_2O)$ in said atmosphere is such that:
   $500 < P(H_2)/P(H_2O) \leq 50\ 000$, during step (a), from $T_I$ until a first intermediate temperature $T_{i1}$ between 1 000° C. and $T_P$ is reached, and
   $P(H_2)/P(H_2O) \leq 500$, at least during step (c), from a second intermediate temperature $T_{i2}$ between $T_P$ and 1 000° C., until $T_F$ is reached.

2. The process according to claim 1, wherein the first intermediate temperature $T_{i1}$ is between 1 300° C. and $T_P$.

3. The process according to claim 1, wherein the second intermediate temperature $T_{i2}$ is between $T_P$ and 1 300° C.

4. The process according to claim 1, wherein the ratio $P(H_2)/P(H_2O) \leq 500$ is implemented as soon as the first intermediate temperature $T_{i1}$ is reached and maintained until $T_F$ is reached.

5. The process according to claim 1, which further comprises, between steps (a) and (b), the following successive steps ($a_1$) to ($a_3$) of:
   ($a_1$) maintaining, for a duration between 1 h and 10 h, the temperature at the hold temperature $T_P$,
   ($a_2$) decreasing the temperature from the hold temperature $T_P$ to a third intermediate temperature $T_{i3}$,
   ($a_3$) increasing the temperature from the third intermediate temperature $T_{i3}$ to the hold temperature $T_P$,
   and wherein the ratio $P(H_2)/P(H_2O)$ in said atmosphere is such that:
   $500 < P(H_2)/P(H_2O) \leq 50\ 000$, during steps (a), ($a_1$) and ($a_2$), and
   $P(H_2)/P(H_2O) < 500$, during steps ($a_3$), (b) and (c).

6. The process according to claim 5, wherein the third intermediate temperature $T_{i3}$ is between 20° C. and 500° C.

7. The process according to claim 1, wherein $T_P$ is 1 700° C.

8. The process according to claim 1, wherein at least one from $T_I$ and $T_F$ is room temperature.

9. The process according to claim 1, wherein increasing the temperature in step (a) is performed at a rate between 30° C./h and 400° C./h.

10. The process according to claim 1, wherein decreasing the temperature in step (c) is performed at a rate between 100° C./h and 900° C./h.

11. The process according to claim 1, further comprising, after step (c), an oxidation heat treatment.

12. The process according to claim 1, wherein the inert gas is chosen from the group consisting of argon, helium and nitrogen.

13. The process according to claim 1, wherein the volume ratio between the inert gas and dihydrogen is between 90/10 and 98/2.

14. The process according claim 1, wherein $M_1$ is an actinide.

15. The process according to claim 1, wherein $M_1$ is a lanthanide.

16. The process according to claim 1, wherein the compacted powder further comprises at least one oxide of a metal $M_2$ selected from Sc, Y, an actinide and a lanthanide, $M_2$ being different from $M_1$, whereby, at the end of step (c), a mixed oxide comprising $M_1$ and $M_2$ is obtained.

17. The process according to claim 16, wherein $M_2$ is an actinide.

18. A process for manufacturing a pellet of at least one oxide of a metal $M_1$ chosen from an actinide and a lanthanide, said process comprising the following successive steps of:
preparing a powder of said at least one oxide of metal $M_1$,
compacting the powder prepared as a pellet, and
heat treating the pellet of compacted powder by the sintering process according to claim 1.

19. The process according to claim 14, wherein $M_1$ is selected from the group consisting of U, Pu and Th.

20. The process according to claim 15, wherein $M_1$ is Ce.

21. The process according to claim 17, wherein $M_2$ is selected from the group consisting of U, Pu and Th.

22. The process according to claim 18, wherein the pellet is a nuclear fuel pellet.

* * * * *